Patented Oct. 11, 1949

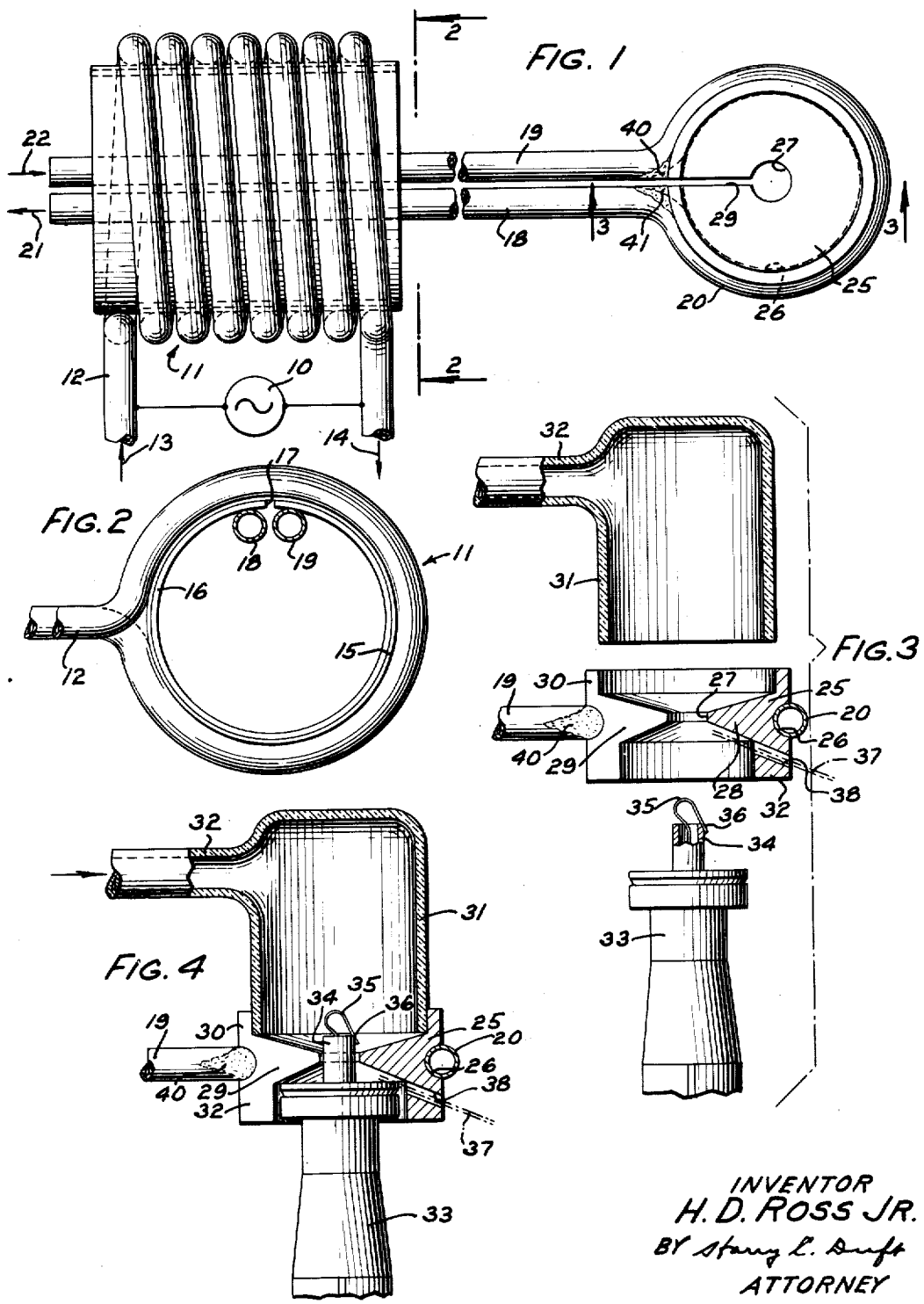

2,484,650

UNITED STATES PATENT OFFICE 2,484,650

INDUCTION BRAZING APPARATUS

Harold D. Ross, Jr., Oak Park, Ill., assignor to Western Electric Company, Incorporated, New York, N. Y., a corporation of New York Application June 25, 1945, Serial No. 601,393

3 Claims. (Cl. 219—12)

This invention relates to brazing apparatus and more particularly to a high frequency apparatus for heating a restricted area of an article to effect a brazing operation thereon.

It is an object of the present invention to provide a simple and effective brazing apparatus.

In accordance with one embodiment of the invention, an apparatus is provided wherein a single loop brazing coil, connected to the secondary of a high frequency transformer, is provided with a slotted mass of conducting material within the coil so contoured as to concentrate the magnetic flux of the coil in a very restricted area and the slug is provided with a cap-receiving cup whereby a protective atmosphere may be flushed over the heated parts to prevent oxidation thereof during the heating of the parts. The slug has an entrance aperture formed therein through which brazing material may be fed to the heated portion of the article on which the brazing operation is to be performed.

A complete understanding of the invention may be had by reference to the following detailed description when considered in conjunction with the accompanying drawings, wherein Fig. 1 is a plan view of an apparatus embodying the invention, parts being broken away to conserve space;

Fig. 2 is a sectional view taken substantially along the line 2—2 of Fig. 1 in the direction of the arrows showing the details of construction of the transformer and its leads to the coil;

Fig. 3 is a vertical sectional view taken substantially along the line 3—3 of Fig. 1 in the direction of the arrows showing the article to be brazed, the coil, and the means for feeding a protective atmosphere to the article in exploded relation; and Fig. 4 is a view similar to Fig. 3 except showing an article in position to be heated and showing the protective atmosphere feeding cap in nesting relation with the conducting slug within the heating coil.

In the drawings, as shown in Fig. 1, a high frequency source of alternating current is illustrated diagrammatically at 10 as being connected across a multiple turn winding, designated generally by the numeral 11. The winding 11 is composed of copper tubing 12, through which a cooling medium may be circulated, as indicated by the arrows 13 and 14, and comprises the primary of a transformer. Any suitable cooling medium may be used to prevent undue heating of the coil. The winding 11 of the tubing 12 is wrapped around a suitable cylindrical insulator 15, which is interposed between the inner surfaces of the multiple turn winding 11 and a single turn tubular winding 16, which is slotted as shown at 17, to prevent short-circuiting thereof. Adjacent the slot 17 the winding 16 has two leads 18 and 19 fixed thereto, for example, by brazing, to conduct the current to a single loop flux concentrating coil 20. The leads 18 and 19 and coil 20 are formed from a continuous length of copper tubing, through which a cooling medium may be passed, for example, in the direction indicated by the arrows 21 and 22 (Fig. 1).

A copper slug or insert 25 is positioned within the coil 20. This slug is generally cylindrical in shape, being provided with a peripherally extending groove 26, in which the coil 20 nests, thus to support the slug or insert 25, which is brazed to the coil. The slug or insert 25 has a central aperture 27, which is formed at the center of a tapered annular shoulder 28 extending inwardly from the side wall of the insert or slug 25 and tapering toward the center thereof. The insert has a slot 29 formed therein which extends from the periphery to the central aperture 27 to prevent short-circuiting of the coil. In brazing the insert 25 to the coil 20, sufficient brazing material, for example, silver solder, is fed between the insert and coil to fill the notches 40 and 41 at the juncture of the tubular leads 18 and 19 with the insert (Fig. 1), thus to maintain the gap between the leads 18 and 19 uniform, whereby the slot 29 constitutes, in effect, a prolongation of said gap.

The shoulder 28, at its upper end, terminates in an annular projection 30, which serves to form a pocket for receiving a glass cap or cup 31, which, in effect, comprises a feeding nozzle for directing carbon dioxide combined with a suitable reducing agent, such as alcohol vapor, through a lead-in tube 32 communicating with the cap or cup 31 to provide a protective atmosphere around an article positioned in the central aperture 27. An annular shoulder 32 on the lower end of the insert 25 serves as a cup to receive the upper end 34 of an article 33, which is to be heated. The upper end 34 of the article is tubular (Fig. 3) and has a wire 35 extending from it, which must be connected to the upper end 34 in such a manner as to form a good electrical connection. Accordingly, the wire is bent over into a slot 36 formed in the upper end 34, and is to be brazed thereto. Since the lower portions of the article, for which this apparatus was designed, might be damaged if heated an appreciable amount, the upper end 34 only of the article is subjected to the high frequency field which is concentrated on the upper end 34 by the narrow end of the tapered shoulder 28 being in close proximity thereto. During the heating of the upper end 34 of the article 33, the various parts are positioned as shown in Fig. 4 and, after the upper end of the article 34 has been heated to a relatively high temperature, the article is moved down to move the point of contact of the wire 35 with the walls of the slot 36 in the upper end of the article into the path of a rod or wire of brazing material 37 inserted through an aperture 38 in the slug or insert 25.

In the operation of the apparatus, the glass cup or cap 31 is set in the slug or insert 25 and carbon dioxide gas, combined with alcohol vapor, is fed through the slug to maintain a protective atmosphere at the point where the end 34 of the article is being heated, as shown in Fig. 4. After the end 34 of the article 33 reaches a predetermined temperature, the article may be moved downwardly slightly and tilted to bring the point of contact of the wire 35 with the slot 36 in the end of the article into position to be contacted by the rod or wire of brazing material. While the brazing coil is being supplied with current from the secondary of the transformer, water or other suitable cooling medium may be passed through both the winding 11 and the coil 20 to maintain them relatively cool while the magnetic flux is concentrated at the aperture 27 of the slug 25.

The entire operation may be observed through the glass cap to facilitate the manipulation of the brazing material and the article while being worked upon.

What is claimed is:

1. A high frequency heating device comprising a loop of conducting material of tubular cross section, a substantially cylindrical mass of conducting material within said loop, a central aperture in said mass of material, a slot in said mass of material extending from the periphery into communication with said aperture, said mass being tapered toward said aperture to concentrate flux in said aperture, a cup-shaped depression coaxial with said aperture in said mass, and means for directing a protective atmosphere through said aperture comprising a cap having an open end inserted into said depression.

2. A high frequency brazing apparatus comprising a coil, a flux concentrating insert positioned within said coil and having a central aperture in which the magnetic flux is concentrated and into which a portion of an article to be heated may be positioned, said insert having a slot extending from the aperture to the periphery thereof, and a conduit member having a portion engageable with one end of said insert and forming an opening in said conduit member for directing a protective atmosphere into said aperture.

3. A high frequency brazing apparatus comprising a coil, a flux concentrating insert positioned within said coil and having a central aperture in which the magnetic flux is concentrated and into which a portion of an article to be heated may be positioned, said insert having a slot extending from the aperture to the periphery thereof, a conduit member having a portion engageable with one end of said insert and forming an opening in said conduit member for directing a protective atmosphere into said aperture, and an aperture extending transversely through the wall of said insert for directing brazing material into the aperture of said insert whereby brazing material may be applied to an article being heated while the article is in said aperture.

HAROLD D. ROSS, Jr.

REFERENCES CITED

The following references are of record in the file of this patent:

UNITED STATES PATENTS

| Number | Name | Date |
| --- | --- | --- |
| 2,024,906 | Bennett | Dec. 17, 1935 |
| 2,048,706 | Pfanstiehl | July 28, 1936 |
| 2,151,035 | Kennedy | Mar. 21, 1939 |
| 2,181,899 | Kennedy | Dec. 5, 1939 |
| 2,228,600 | Hardy | Jan. 14, 1941 |
| 2,314,865 | Bierwirth | Mar. 30, 1943 |
| 2,314,875 | Gillespie | Mar. 30, 1943 |
| 2,329,944 | Schakenbach | Sept. 21, 1943 |
| 2,397,990 | Sherman | Apr. 9, 1946 |
| 2,408,229 | Roberds | Sept. 24, 1946 |

FOREIGN PATENTS

| Number | Country | Date |
| --- | --- | --- |
| 286,823 | Great Britain | Mar. 15, 1928 |
| 385,285 | Great Britain | Jan. 19, 1933 |

OTHER REFERENCES

Roberds: Electronic Industries, April 1944, page 180.